No. 654,543. Patented July 24, 1900.
H. Q. HOOD.
COOKING STOVE.
(Application filed Mar. 10, 1900.)
(No Model.)
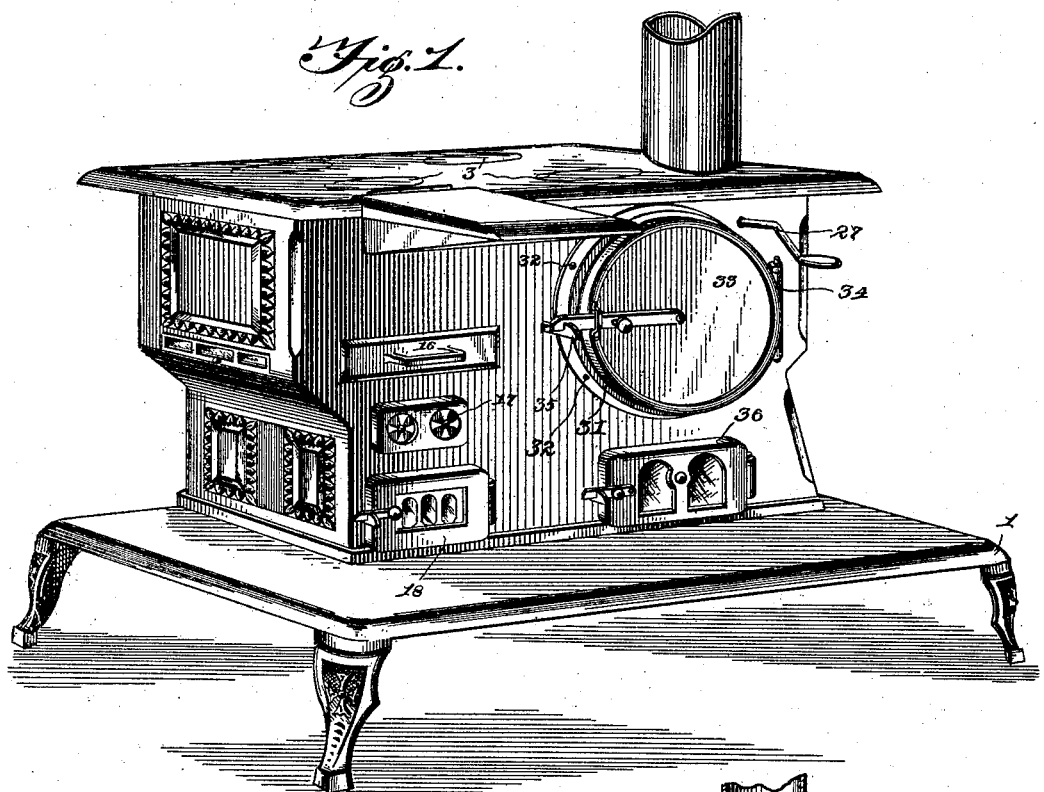
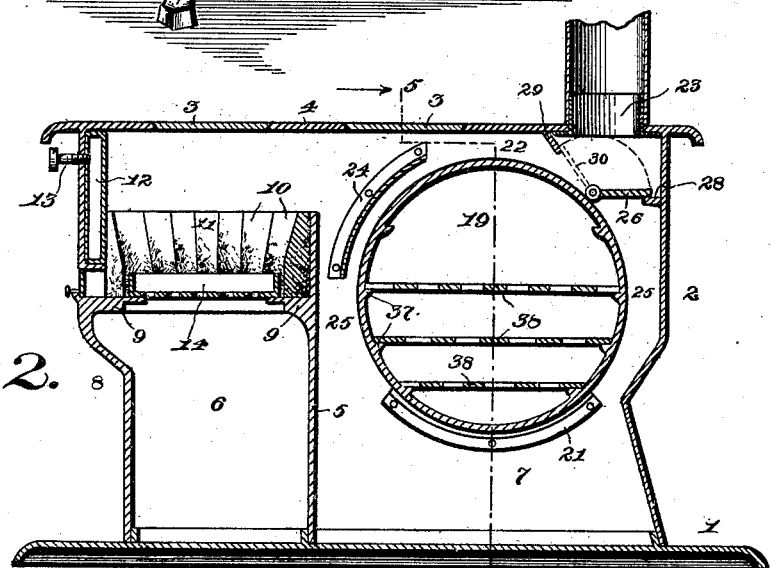
Witnesses Hiram Q. Hood, Inventor
By his Attorneys,

UNITED STATES PATENT OFFICE.

HIRAM Q. HOOD, OF CARTHAGE, MISSOURI.

COOKING-STOVE.

SPECIFICATION forming part of Letters Patent No. 654,543, dated July 24, 1900.

Original application filed January 28, 1899, Serial No. 703,708. Divided and this application filed March 10, 1900. Serial No. 8,197. (No model.)

*To all whom it may concern:*

Be it known that I, HIRAM Q. HOOD, a citizen of the United States, residing at Carthage, in the county of Jasper and State of Missouri, have invented a new and useful Cooking-Stove, of which the following is a specification.

My invention is an improved cooking-stove; and it consists in the peculiar construction and arrangement of devices hereinafter fully set forth, and pointed out in the claim.

In the accompanying drawings, Figure 1 is a perspective view of a cooking-stove embodying my improvements. Fig. 2 is a vertical longitudinal sectional view of the same.

1 represents the base-plate of the stove, and 2 the casing thereof, which casing is substantially rectangular in form and is adapted to be cast and is provided with the removable lids and cover-sections 3 4, as is usual in stoves of this class.

Near one end of the casing is a vertical partition-plate 5, which divides the interior of the casing into an ash-pit 6 and an oven-chamber 7. Formed with the partition-plate 5 and the proximate end 8 of the stove-casing, on the opposing inner sides thereof and at a suitable distance below the upper edge of the partition-plate 5, are horizontally-disposed supporting-flanges 9, on which are supported the fire bricks or blocks 10 of the fire-box 11. It will be observed by reference to Fig. 2 of the drawings that the upper side of the fire-box is at some distance below the top of the stove-casing and that a boiler-chamber 12 is interposed between one side of the fire-box and the proximate outer end of the stove-casing, in which boiler-chamber water may be heated, said chamber being adapted for the connection of water-pipes therewith to maintain the circulation of water therein. The said chamber 12 is formed separably from the stove-casing of any suitable material and is adapted to be inserted in place between the proximate sides of the fire bricks or blocks and the end wall of the stove-casing and may be readily removed therefrom, and said boiler-chamber is secured in place by means of a screw or bolt 13, which passes through a threaded opening in the proximate end wall of the stove-casing and engages a threaded opening in said boiler-chamber. A removable grate 14 is supported on the inner portions of the flanges 9, which project inwardly beyond the inner sides of the fire bricks or blocks, and one end of said removable grate projects through an opening 15 in the front side of the stove-casing and is provided with a handle 16, by means of which the grate may be readily withdrawn from the stove when desirable. The said grate is fully shown and described in my pending application for Letters Patent of the United States, filed January 28, 1899, Serial No. 703,708, of which this is a divisional application. The ash-pit 6 below the grate is provided with suitable draft-openings 17 and an ash-door 18 in the front side of the stove-casing.

In the oven-chamber 7 of the stove-casing is transversely disposed a cylindrical removable oven 19, the same being inserted through a circular opening in the front side of the stove-casing and supported at its inner end on a curved segmental flange-plate 21, which is bolted to the rear side wall of the stove-casing on the inner side thereof, as shown. The upper side of the cylindrical removable oven is disposed within a suitable distance of the stove cover or top, so that a flue 22 is formed between the fire-box and the stove-pipe-opening 23, said flue passing over said oven. Said stovepipe-opening 23 is located at the end of the top of the stove, partially beyond the outer side of the oven, so that the said flue extends entirely across the top of the oven, as shown in Fig. 2. A shield 24, which is in the form of a segment concentric with the oven, is interposed between the oven and the fire-box about midway in the space between the front sides of the oven and the rear side of the fire-box. It will be further observed by reference to Fig. 2 that the oven is located substantially in the center longitudinally of the oven-chamber 7, so that a flue 25 is formed around the under side of the oven. A damper 26 is located below the smoke-opening 23 at the intersection of the upper flue 22 and lower flue 25 and on or proximate to the rear side of the upper portion of the oven, said damper being provided with a crank-handle 27, which projects without the front side of the stove. A horizontal flange 28 in the rear side or end wall of the stove-casing constitutes a stop for the said damper when the latter is turned to a horizontal position, so as to close the lower flue 25, as shown in Fig. 2, and an inclined flange 29, which depends from the cover of the stove-casing at a point slightly in front of the smoke-opening 23, serves as a stop for the said damper when the latter is turned forward to the inclined position indicated by the dotted lines at 30, so as to cut off communication between the upper flue 32 and the smoke-opening 23. The shield 24 is interposed between the fire-box and the oven to protect the latter from direct heat from the fire-box and prevent the oven from being unduly heated on the upper side thereof, which is proximate to the space directly in rear of the fire-box.

It will be understood that inasmuch as the damper 26 is located at the intersection of the upper and lower flues around the oven and between said flues and the smoke-opening 22 either of said flues may be cut off at will, and hence the heated air from the fire-box may be caused to pass either over or under the oven, as may be necessary to secure the best results in roasting or baking articles therein.

The outer end of the oven, which is open, is provided with an annular flange or head 31, which bears against the outer side of the stove-casing and is secured thereto by bolts, as at 32, and it will be understood that by removing said bolts the said oven may be readily taken from the stove-casing simply by drawing the same longitudinally through the opening 20 in the outer side of the stove-casing, as indicated in dotted lines in Fig. 5. A cap or door 33 is provided for the open outer end of the oven, said cap or door being circular in form, as shown in Fig. 1, and hinged at one side to the flange or head 31, as at 34, and provided on the opposite side with a suitable latch, as at 35, whereby it may be fastened when closed. By thus constructing the stove-casing and oven so that the latter may be readily removed at will I greatly prolong the life of the stove, because the oven, when the same becomes worn or burned out, may be readily removed from the comparatively-uninjured stove-casing and replaced by a new oven, and this provision, whereby the oven may be removed readily from the stove-casing, is also highly advantageous in this, that thereby access may be readily obtained through the opening 20 to the interior of the oven-chamber 7, so that the latter may be readily cleaned and the accumulation of soot and other products of combustion removed through the door 36, with which the outer side of the stove-casing is provided, said door 36 being preferably immediately below the opening 20 and the outer projecting head of the oven.

The oven is provided interiorly on opposite sides with a series of supporting-flanges 37 for the removable and adjustable grids 38.

Having thus described my invention, I claim—

A stove comprising a casing, a vertical partition-plate therein, extending from the bottom thereof to a point some distance below the top of the casing, said partition-plate dividing the interior of the casing into a combustion-chamber and an oven-chamber which communicate with each other above the partition-plate, an oven so disposed in the oven-chamber as to form flues over, around and under said oven and communicating directly with each other both at a point intermediate of the oven-chamber and combustion-chamber and at a point beyond the oven at the smoke-exit at the rear side of the stove, a damper located in the intersection of said flues and adapted to cut off either of them at will, whereby the draft from the combustion-chamber may be caused to pass either directly over or directly under the oven, and a shield located intermediate of the space in the oven-chamber which communicates with the combustion-chamber, said shield not obstructing or closing the said flues, substantially as described.

In testimony that I claim the foregoing as my own I have hereto affixed my signature in the presence of two witnesses.

HIRAM Q. HOOD.

Witnesses:
J. P. NEWELL,
FRANKLIN GREENWOOD.